United States Patent
Anson et al.

(10) Patent No.: US 7,715,542 B2
(45) Date of Patent: May 11, 2010

(54) SERVICE DELIVERY METHOD AND SYSTEM

(75) Inventors: Colin I' Anson, Bristol (GB); Rycharde Jeffery Hawkes, Bristol (GB); James Thomas Edward McDonnell, Bristol (GB); Andrew Thomas, Los Altos, CA (US); Lawrence Wilcock, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 09/881,040

(22) Filed: Jun. 15, 2001

(65) Prior Publication Data

US 2002/0028671 A1   Mar. 7, 2002

(30) Foreign Application Priority Data

Jun. 17, 2000 (GB) .................................. 0014759.5

(51) Int. Cl.
*H04M 3/42* (2006.01)
(52) U.S. Cl. ................ 379/207.12; 455/419; 455/456.3
(58) Field of Classification Search .............. 455/414.1, 455/414.2, 466, 418, 456.6, 456.2, 419, 422.1, 455/456.3; 235/381; 705/26, 14, 66; 709/229; 342/357.1; 713/171; 707/9; 379/88.02, 379/207.02, 207.12
See application file for complete search history.

(56) References Cited

U.S. PATENT DOCUMENTS

| | | | |
|---|---|---|---|
| 5,511,121 A | 4/1996 | Yacobi | |
| 5,557,518 A | 9/1996 | Rosen | |
| 5,568,153 A * | 10/1996 | Beliveau | 342/357.1 |
| 5,594,789 A * | 1/1997 | Seazholtz et al. | 379/88.02 |
| 5,677,955 A | 10/1997 | Doggett et al. | |
| 5,678,194 A | 10/1997 | Grube et al. | |
| 5,705,798 A * | 1/1998 | Tarbox | 235/379 |
| 5,870,473 A | 2/1999 | Boesch et al. | |
| 6,011,973 A * | 1/2000 | Valentine et al. | 455/456.6 |

(Continued)

FOREIGN PATENT DOCUMENTS

DE   195 44 157   5/1997

(Continued)

OTHER PUBLICATIONS

Russell, *Telecommunications Protocols*, McGraw-Hill, 1997.

(Continued)

*Primary Examiner*—MD S Elahee

(57) ABSTRACT

A user is pre-qualified for a service provided at a particular location. Location data indicative of where the service is to be triggered and a service element are stored. The service instance element is a full customised instance of the service delivery code or other item that provides an association between the user and an instance of the service for which the user is qualified. The user location, as indicated by a mobile entity associated with the user, is periodically checked against the location data. When a location match occurs, the service instance for which the user has been qualified is executed to deliver the required service to the user. An example is an airline traveler buying, from a travel agent, an air ticket having an associated service wherein, the traveler, upon arriving at the relevant airport, is contacted via its mobile device and guided through check-in and boarding.

23 Claims, 6 Drawing Sheets

U.S. PATENT DOCUMENTS

| | | | | |
|---|---|---|---|---|
| 6,129,274 | A | * | 10/2000 | Suzuki .................... 235/381 |
| 6,185,541 | B1 | * | 2/2001 | Scroggie et al. ............. 705/14 |
| 6,233,448 | B1 | * | 5/2001 | Alperovich et al. ......... 455/417 |
| 6,442,391 | B1 | * | 8/2002 | Johansson et al. ........ 455/456.2 |
| 6,526,275 | B1 | * | 2/2003 | Calvert .................... 455/418 |
| 6,601,102 | B2 | * | 7/2003 | Eldridge et al. ........... 709/229 |
| 6,625,580 | B1 | * | 9/2003 | Tayama .................... 705/26 |
| 6,718,328 | B1 | * | 4/2004 | Norris ..................... 707/9 |
| 2004/0128257 | A1 | * | 7/2004 | Okamoto et al. ............ 705/66 |

FOREIGN PATENT DOCUMENTS

| | | | |
|---|---|---|---|
| GB | 2 348 777 | | 10/2000 |
| WO | 97/41654 | | 11/1997 |
| WO | WO97/41654 | | 11/1997 |
| WO | WO 9741654 | * | 11/1997 |
| WO | WO98/19479 | | 5/1998 |
| WO | 98/58506 | | 12/1998 |
| WO | 98/59506 | | 12/1998 |
| WO | WO98/58506 | | 12/1998 |
| WO | WO 9859506 A2 | * | 12/1998 |
| WO | WO99/52316 | | 10/1999 |
| WO | WO0030379 A1 | * | 5/2000 |

OTHER PUBLICATIONS

GSM 03.71 V7.3.0 (Feb. 2000), Digital cellular telecommunications system (Phase 2+), Location Services (LCS) (Functional description)—Stage 2 (GSM 03.71 version 7.3.0 release 1998), published in Feb. 2000.

ETSI TS 101 723 V7.2.0 (Feb. 2000), Digital cellular telecommunications system (Phase 2+_, Location Services (LCS), Service Description—Stage 1 (GSM 02.71 version 7.2.0 release 1998), published in Feb. 2000.

* cited by examiner

SERVICE DELIVERY METHOD AND SYSTEM

FIELD OF THE INVENTION

The present invention relates to the delivery of services to mobile users in dependence on the location of the users.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set Up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22-24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, much interest has been shown in "location-based", "location-dependent", or "location-aware" services for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location. The term "location-aware services" will be used herein to refer generically to these and similar services where a location dependency exists.

Location-aware services all require user location as an input parameter. A number of methods already exist for determining the location of a mobile user as represented by an associated mobile equipment. Example location-determining methods will now be described with reference to FIGS. 2 to 5. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 5 exist.

As well as location determination, FIGS. 2 to 5 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request.

The location-determining method illustrated in FIG. 2 uses an inertial positioning system 50 provided in the mobile entity 20A, this system 50 determining the displacement of the mobile entity from an initial reference position. When the mobile entity 20A wishes to invoke a location-aware service, it passes its current position to the corresponding service system 40 along with the service request 51. This approach avoids the need for an infrastructure to provide an external frame of reference; however, cost, size and long-term accuracy concerns currently make such systems unattractive for incorporation into mass-market handheld devices.

FIG. 3 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 3 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data may be the Internet home page URL of a store housing the beacon 55 concerned, this home page giving the store location—or at least identity, thereby enabling look-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include it's identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20B and 20C, separate systems 40 may be provided for each mobile type (this is likewise true in respect of the service systems depicted in FIGS. 4 and 5).

FIG. 4 depicts several forms of GPS location-determining system. On the left-hand side of FIG. 4, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 4 depicts, in relation to mobile entity 20E, two ways in which assistance can be provided to the entity in deriving location from GPS satellites. Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" Jul. 1, 1999 Lucent Technologies, Bell Labs). Secondly, as an alternative enhancement, the processing load on the mobile entity 20E can be reduced and encoded jitter removed using the services of network entity 64 (in or accessible through PLMN 10).

One the mobile unit 20E has determined its location, it can pass this information in request 65 when invoking a location-aware service provided by service system 40.

FIG. 5 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 5 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 3, when the mobile entity 20G of FIG. 5 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of FIG. 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 5 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67.

Further with respect to the location servers 57, 67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

As already indicated, FIGS. 2 to 5 depict only some examples of how location determination can be achieved, there being many other possible combinations of technology used and where in the system the location-determining measurements are made and location is calculated, stored and used. Thus, the location-aware service may reside in the mobile entity whose location is of interest, in a network-connected service system 40 (as illustrated), or even in another mobile entity. Furthermore, whilst in the examples of FIGS. 2 to 5, invocation of the location-aware service has been by the mobile entity whose location is of interest, the nature of the location-aware service may be such that it is invoked by another party (including, potentially, the PLMN itself). In this case, unless the invoking party already knows the location of the mobile entity and can pass this information to the location-aware service (which may, for example, may be situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 5 needs to find the location of mobile 20G, it could be arranged to do so by requesting this information from location server 67 which in turn requests the location data from the relevant BSC, the latter then making the necessary determination using measurements from BTSs 13.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

It is an object of the present invention to provide an improved method and system for service delivery to mobile users.

SUMMARY OF THE INVENTION

According to one aspect of the present invention, there is provided a service delivery method comprising the steps of:
  qualifying a user as authorised to benefit from an instance of a particular service, and storing:
    location data indicative of at least one location where service delivery is to be triggered, and
    a service instance element that associates the user and the service instance for which the user has been qualified; and
  subsequently detecting a location match between the location of the user, as indicated by a mobile entity associated with the user, and a location indicated by said location data, and thereupon initiating delivery to the user of the service instance associated with the user by the service instance element.

According to another aspect of the present invention, there is provided a service delivery system comprising:
  a location description repository for storing location data;
  a service-instance-element repository for storing at least one service instance elements;
  a qualification subsystem for determining whether a user qualifies to benefit from an instance of a particular service, the qualification subsystem being operative, upon determining that a user is so qualified, both to store in the location repository location data indicative of at least one location where service delivery is to be triggered, and also to store in the service-instance-element repository a service instance element that associates the user and the service instance for which the user has been qualified;

a service execution environment for executing service instances;

a location match subsystem for detecting a location match between the location of the user, as indicated by a mobile entity associated with the user, and a location indicated by said location data; and a control arrangement responsive to the location subsystem detecting a said location match to initiate execution of the service instance associated with the user by the service instance element.

BRIEF DESCRIPTION OF THE DRAWINGS

A service delivery method and system, both embodying the present invention, will now be described, by way of non-limiting example, with reference to the accompanying diagrammatic drawings, in which.

BEST MODE OF CARRYING OUT THE INVENTION

Figure 6:
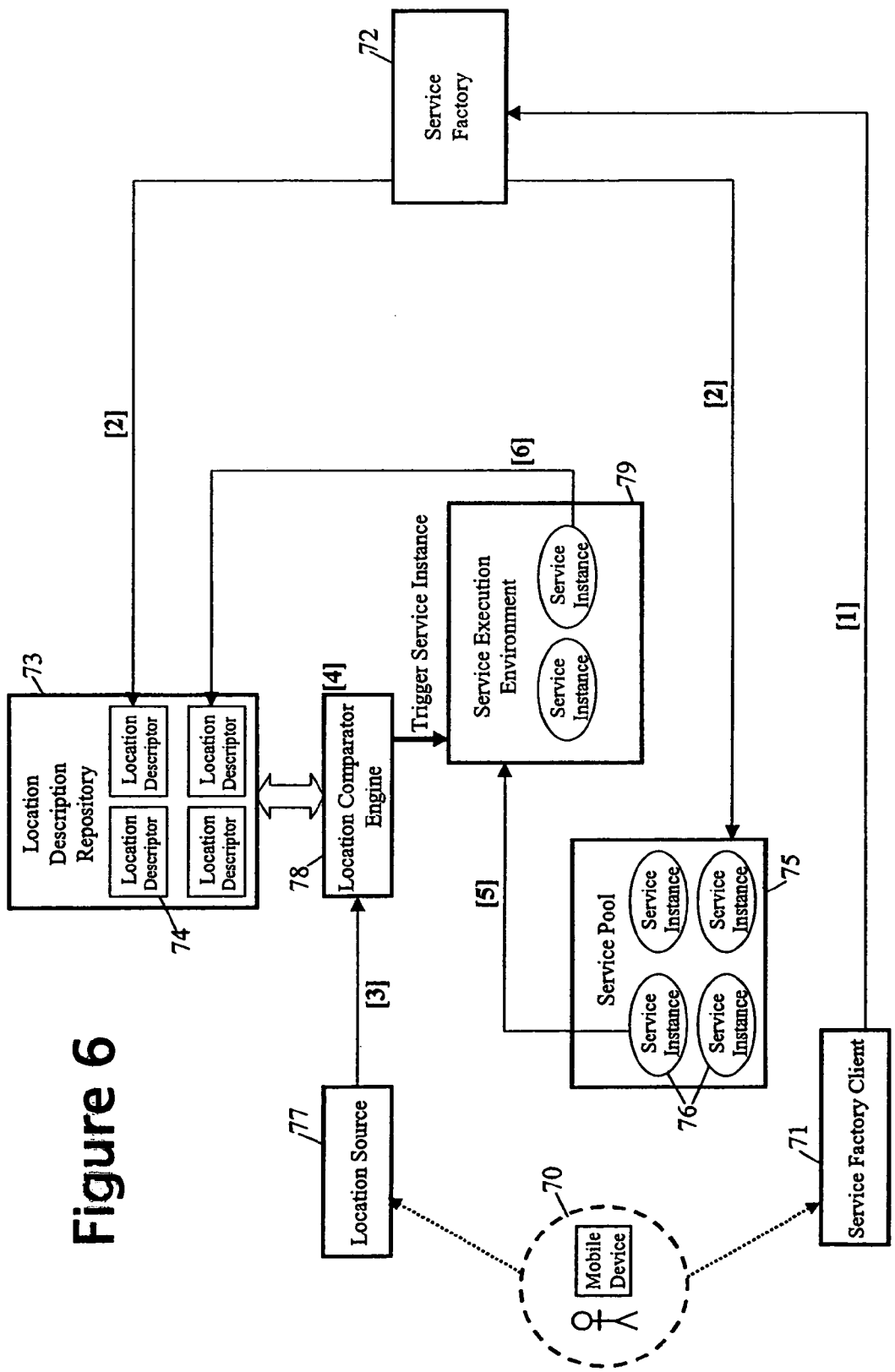
FIG. 6 is a diagram illustrating the main logical components of a service delivery method and system embodying the invention.
Figure 7:
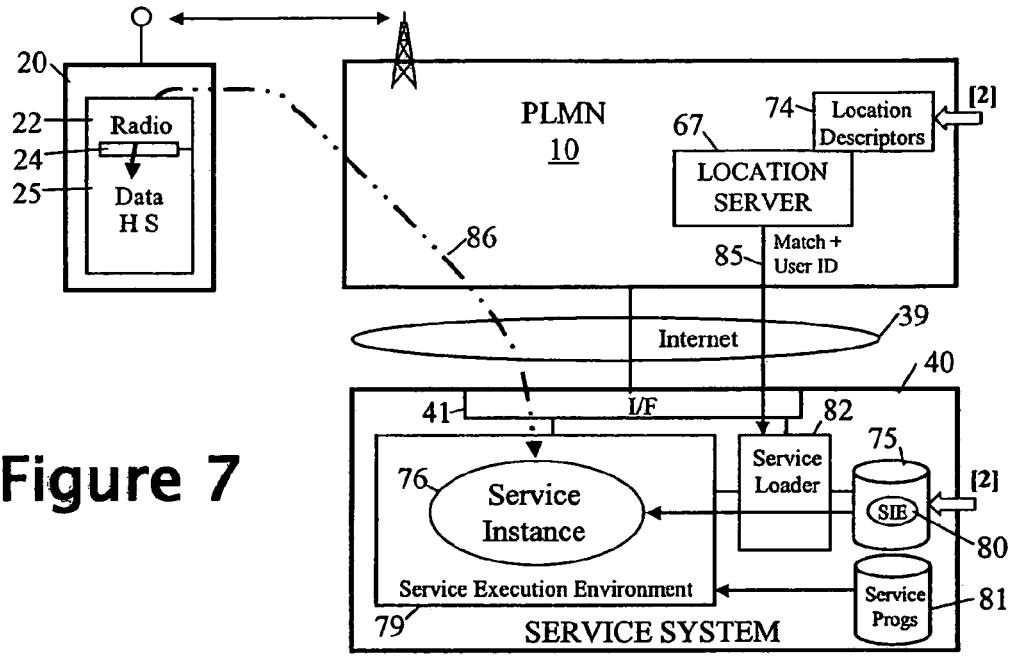
FIG. 7 is a diagram illustrating a first specific embodiment of the invention.
Figure 8:
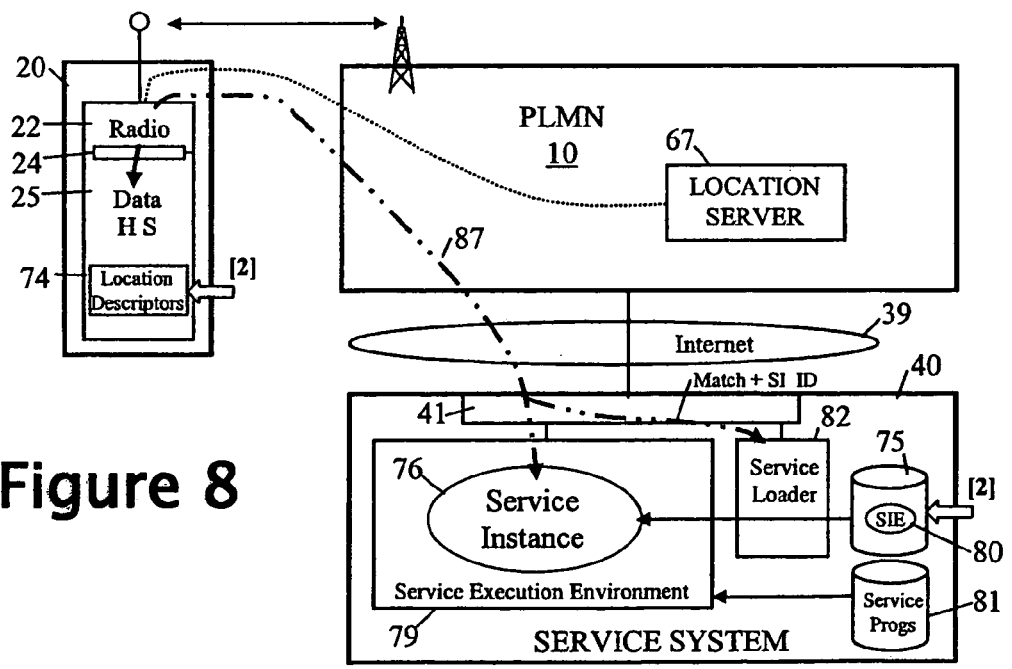
FIG. 8 is a diagram illustrating a second specific embodiment.
Figure 9:
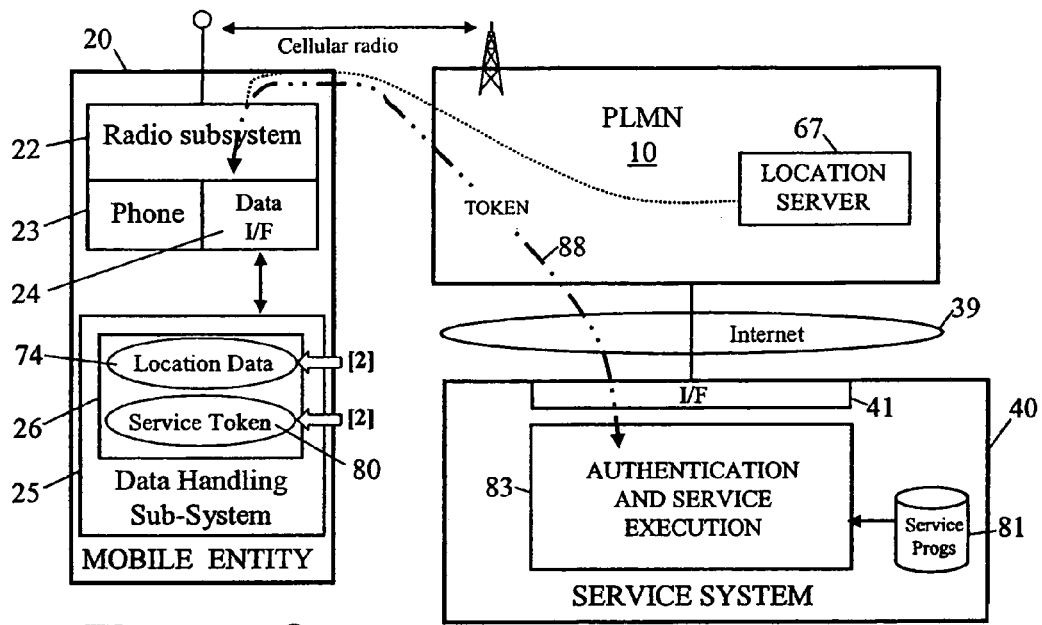
FIG. 9 is a diagram illustrating a third specific embodiment.

Service delivery methods and systems embodying the invention will now be described with reference to FIGS. 6 to 10. The specific embodiments of FIGS. 7 to 10 depict a user with a cellular mobile device and a mobile infrastructure with a location server for providing location data about mobile users; the specific embodiments shown in FIGS. 7 to 9 also depict a service system 40 connected to the public Internet 39. It is to be understood that the present invention is not limited to the specifics of the mobile entity, location discovery means or communication infrastructure shown in the Figures and the generalisations discussed above in relation to FIGS. 1 to 5 regarding these elements apply equally to the operational context of the described embodiments of the invention. Thus, whilst the service system 40 in FIGS. 7 to 9 is shown as connected to the public Internet, it could be connected to a GPRS network 17 or to another fixed data network interfacing directly or indirectly with the network 17 or network 39. Furthermore, communication between the user's mobile entity and a service system can be via a communication infrastructure that does not use cellular radio; for example, a short-range wireless system could be used.

Consideration will first be given to the generalised embodiment of the service delivery method shown in FIG. 6. In FIG. 6 a user entity 70 is depicted which comprises a user and a mobile device through which the location of the user can be ascertained (for example, a mobile entity 20 such as shown in FIGS. 2 to 5). For convenience, the term "user entity" will be used both for actions/events involving only the device itself and actions/events involving the user acting through the mobile device; the reference 70 will be used both for the user entity and for the user alone.

[1] When the user 70 subscribes to a service or buys a product with which a service is associated, the service seller, acting through a service factory client 71, causes an executable service instance 76 to be created by a service factory 72 associated with the service. The service instance is an embodiment of the behavior associated with the purchased service. The service instance is associated with a set of well-defined locations that are of interest to the service. These locations are specified in location descriptors 74 that either specify locations or polygonal areas, either as a set of x,y coordinates, or as a set of high-level semantic representations such as "Lloyds Bank, Bristol" that can be mapped to physical locations. Each user has a Service Repository 75 to hold the current set of service instances 76 active for the user's context. The Location Descriptors 74 associated with the service instances of the user are held in a Location Descriptor Repository 73.

[2] The newly created service instance 76 and an initial set of one or more location descriptors 74 to be applied to the service, are downloaded respectively to the Service Repository 75 and Location Descriptor Repository 73 of the user. The service remains dormant until the location of the user entity 70 matches one of the locations defined by the Location Descriptors defined for the service.

[3] The physical location of the user entity 70 is obtained by a location source 77 in any suitable manner and passed on a periodic basis to a Location Comparator Engine 78.

[4] The Location Comparator Engine 78 compares the current location of entity 70 with the set of active Location Descriptors 74. If a match is found, a trigger is sent to a Service Execution Environment 79, this trigger identifying the service instance to be executed (for example, by combination of user ID and location, or by a service instance identifier held with the matched Location Descriptor)

[5] the Service Execution Environment 79 loads the appropriate service instance 76 and executes it, passing in the current location if required. The service may be one that once triggered, runs to completion regardless of subsequent changes in location, or one that only functions whilst the location matches a location descriptor. In this latter case, location samples are taken at intervals and the service only continues to run for as long as the current location matches the Location Descriptors of the service.

[6] The service can be enabled to specify the frequency of location updates it requires, and also modify the set of Location Descriptors 74 to be applied.

The physical location of the functional entities 71, 72, 73, 75, 77, 78 and 79 depends on the architecture of the network infrastructure used to inter-communicate the entities and the capabilities of the mobile device of user entity 70. Thus, whilst the Service Factory 72 will generally be located in the network infrastructure, each of the other entities could be located either on the mobile device or in the network.

A possible service delivery scenario is as follows. A customer buys an airline flight ticket. A service instance 76 is instantiated by the airline to identify the specific purchasing transaction, so that the behavior of the service instance can be made dependent on characteristics of the transaction. A description of the location trigger point(s) of the service is stored either in the user's mobile device (e.g. a cell-phone device) or in the cellular radio infrastructure. Assume that a trigger point is the airport. When the customer arrives at the airport, the location of the mobile device as determined by the cellular radio infrastructure matches the trigger point of the service. The service instance is now activated, can welcome the customer by name, politely ask them to check in, invite and direct the customer to airline lounge if the customers ticket is of the appropriate type, and finally remind the customer to leave the lounge when the flight is boarding.

In the FIG. 6 embodiment, a full executable service instance is created by the service factory. This is particularly useful where the service execution environment is either the mobile device or another system which does not have large resources or continual network access. An alternative approach is to store instance customization data that can be used to customize generalized service code that is available to the service execution environment either because the latter has resources to store such code or can access the code across a network connection.

Thus, in general terms, the service factory, once it is satisfied that the user has qualified for the service (for example, by having paid or by having appropriate attributes), generates a service instance element that associates the user with an instance of the service for which the user has been qualified. The service instance element can be a full executable code version of the service as described above in relation to FIG. 6, customization data customizing a generalized service to the user, or even just an indicator that the user is entitled to the benefits of a service instance which is not otherwise subject to customization.

A number of different ways can be used by the service instance element to associate the user and the service instance for which the user has been qualified. One way is to have the service instance element contain an identifier of the user, the instance element either itself including the instance executable or including a reference to the latter; in this case, the location trigger process results in the user identifier being produced for matching up with the service instance element (note that if multiple service instance elements are stored for the same user, additional information such as triggering location, may be required to distinguish between the service instance elements). Another way is to include a service instance identifier in the service instance element, this identifier also being associated with the user (for example, by being known to the user entity) and being produced by the location trigger process for matching with the service instance element. A third way of having the service instance element associate a user with a particular service instance is to store the service instance element in the user entity or other user-dedicated entity.

With regard to the location triggering process, it will be appreciated that this can be implemented in many ways. For example, the location descriptors can be stored in a service system containing the service execution environment, the user's current location being provided to the service system by a location server (such as server 57 of FIG. 3 or server 67 of PLMN 10 of FIG. 5) or by the user entity 70 itself (the entity 70 having discovered its location by any of the methods depicted in FIGS. 2 to 5, for example). Alternatively, the location descriptors could be stored in a location server 57 or 67 with location matching also being effected in the server. Another possibility is to store the location descriptors in the user entity 70 itself, the latter discovering its location by a method of FIGS. 2 to 5 and effecting the location matching process itself.

Specific example embodiments will now be described with reference to FIGS. 7 to 10.

In the FIG. 7 embodiment, the service factory has loaded a service instance element (SIE) 80 into a database 75 of a service delivery system 40 and a corresponding location descriptor 74 into a repository 73 associated with location server 67 of PLMN 10. The SIE 80 comprises, in this example, a user identifier (user ID) and user-specific customization data. The location descriptor 74 also includes the user ID and the location server 67 of PLMN understands which PLMN subscriber is identified by this user ID (conveniently, the user ID can be the IMSI associated with the user). Service system 40 comprises, as well as database 75, a program database 81 holding the generic program code for the services to be delivered by the system, a service execution environment 78, a service loader 82 for loading the correct service program and customization data to provide a required service instance, and interface 41 for interfacing the service system with a communication infrastructure (here shown as internet 39).

Figure 1:
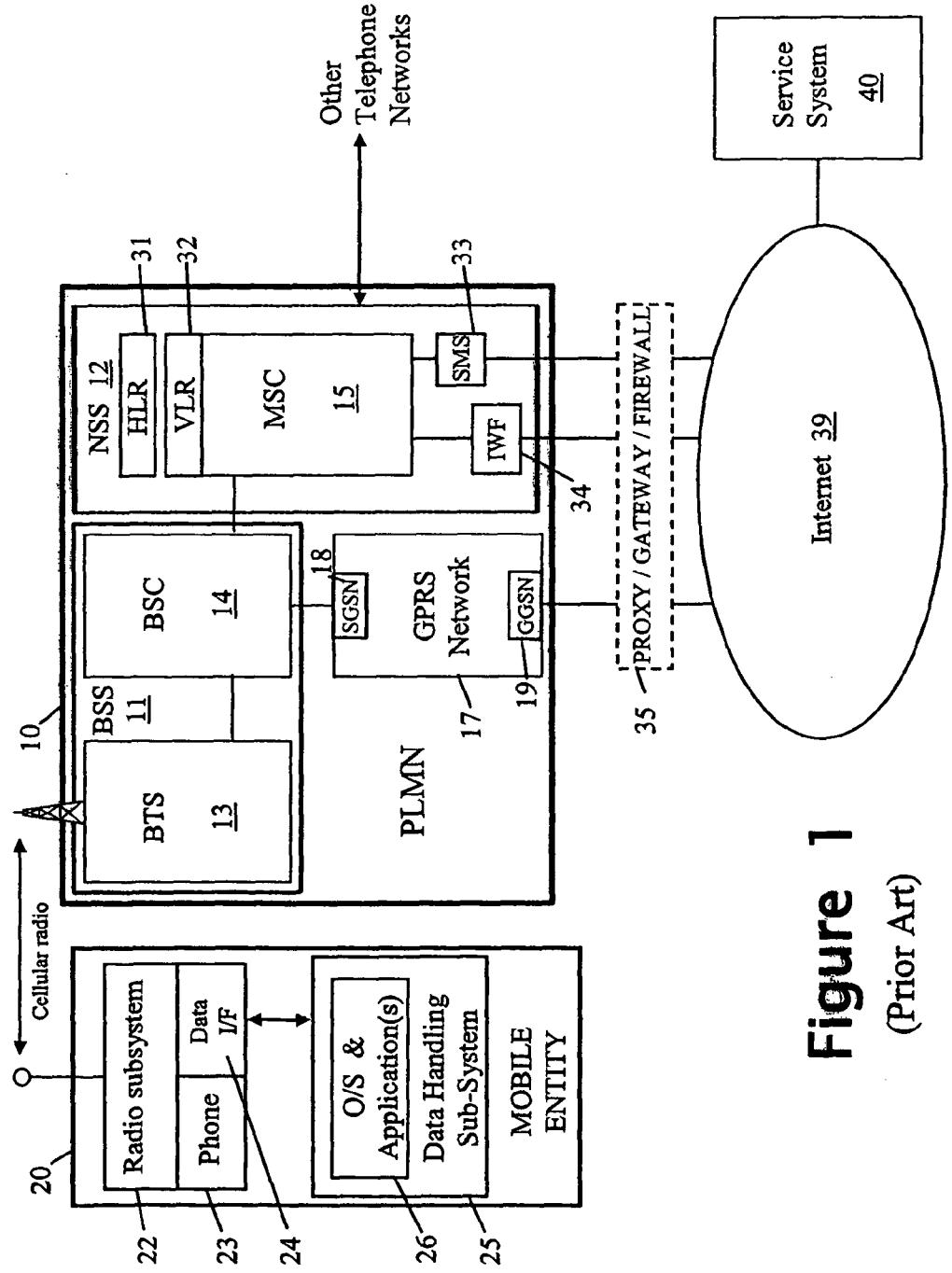
FIG. 1 is a diagram of a known communications infrastructure usable for transferring voice and data to/from a mobile entity.
Figure 2:
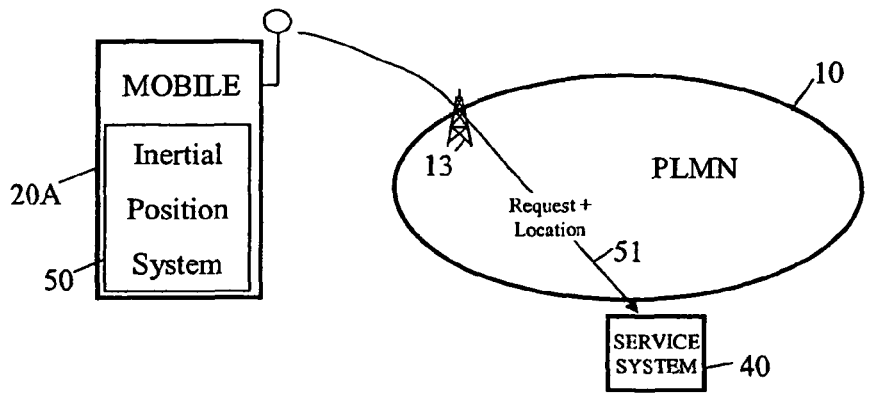
FIG. 2 is a diagram illustrating one known approach to determining the location of a mobile entity, this approach involving providing the entity with an inertial positioning system.
Figure 3:
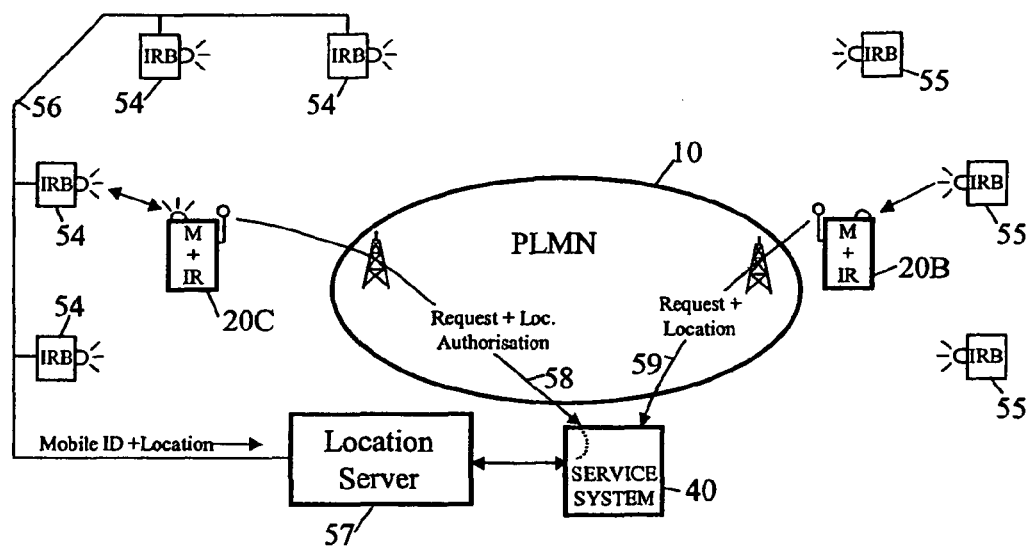
FIG. 3 is a diagram illustrating another known approach to determining the location of a mobile entity, this approach being based on proximity of the mobile entity to fixed-position local beacons.
Figure 4:
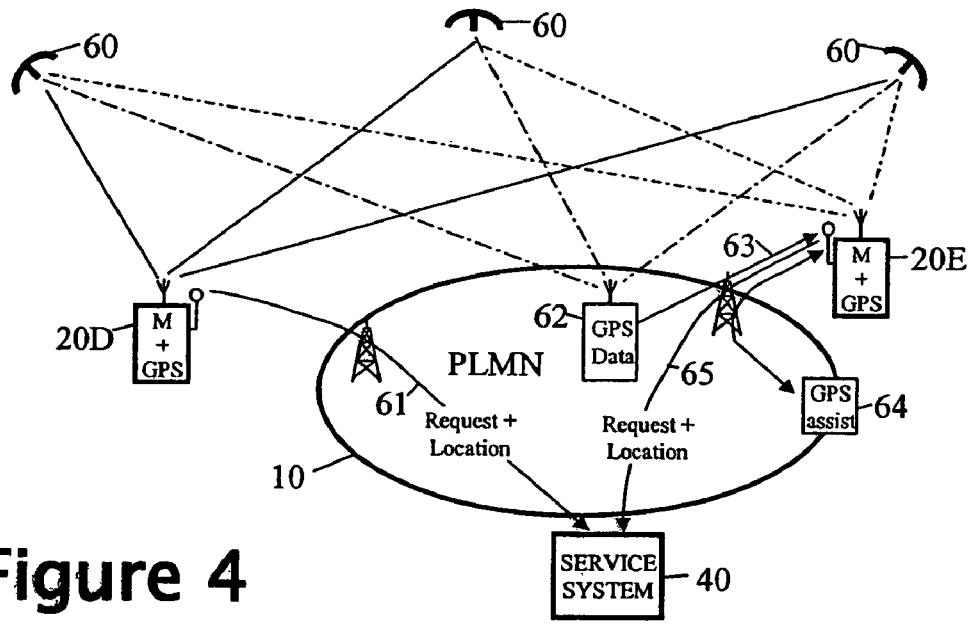
FIG. 4 is a diagram illustrating a further known approach to determining the location of a mobile entity, this approach involving the use of GPS satellites.
Figure 5:
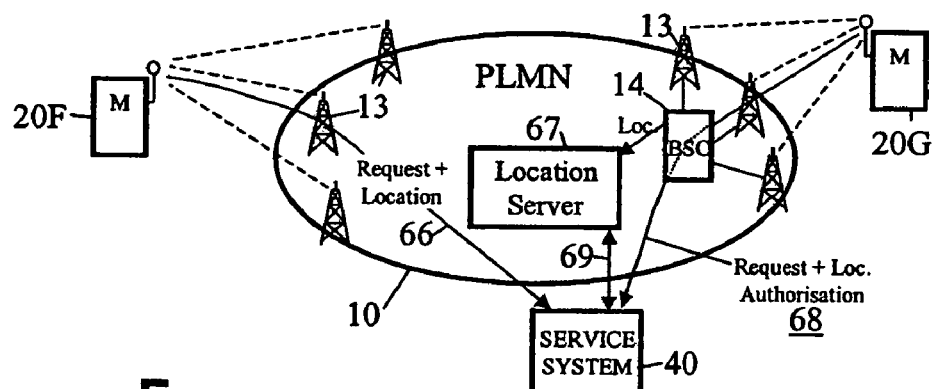
FIG. 5 is a diagram illustrating a still further approach to determining the location of a mobile entity, this approach being based on the use of signals present in a cellular mobile radio communications system.

The user's mobile device is a cellular-radio mobile entity 20 such as described with reference to FIG. 1 and is capable of communicating with the service system 40 via a data-capable bearer service of PLMN 10 and internet 39. When the mobile entity is in a switched-on state, location server 67 of PLMN 10 is capable of determining the location of the mobile entity.

In operation, upon the mobile entity 20 being detected by location server 67 as at a location matching a location descriptor 74 associated with the user, a location match trigger (including user ID and possibly also user location) is passed from the location server 67 to the service loader 82 of the service system 40 (see arrow 85). The service loader uses the user ID (and possibly also the user location) to identify the corresponding SIE 80. The SIE 80 identifies the service program to be executed and service loader 82 causes the relevant program to be loaded into the service execution environment along with the customization data contained in the SIE 80 in order to create and run the service instance for which the user has been prior authorized. Execution of the service instance will generally (but not necessarily) involve communication between the service system and the user's mobile entity 20, for example using a data-capable bearer service of PLMN 10 (see arrow 86).

The FIG. 8 embodiment is similar to that of FIG. 7 except that now the location descriptors 74 are stored in mobile entity 20, each with an associated service instance identifier (SI ID), and the SIEs 80 stored in database 75 each include a corresponding SI ID. Location matching between the location descriptors and the user's current location (as identified to the entity 20 by location server 67 or discovered in some other way) is done in the mobile entity 20. When a match is detected, the SI ID associated with the matched location is passed to the service loader 82 (see arrow 87) which looks up the corresponding SIE 80 in database 75 and then oversees running of the appropriate service instance. If required, the SIE 80 can include both the user ID and the locations where the service instance is permitted to be triggered; the service loader can then be arranged to confirm (and possibly even require authentication of) the user's identity and the origin of the user's location fix (the service instance may, for example, require that only location fixes by location server 67 will be trusted, in which case the mobile entity 20 can be required to provide digitally-signed location data from the server 67).

In the FIG. 9 embodiment, the location descriptors 74 are again stored in the mobile entity 20 where location matching is effected. However, now the SIE 80 is also stored in the mobile entity 20 and takes the form of a service token that can be used to claim service instance delivery from a service system 40. The service token is associated with the user by virtue of being stored in the mobile entity 20 and includes data identifying the service to be provided by service system 40 and any service customization data; advantageously, the service token also includes address (and password) details for contacting the service system. In operation, upon a location match being detected, the mobile entity transits the service token, via a data-capable bearer service of PLMN 10 and the internet 39, to the service system. At the service system, the token is passed to an authentication and service execution subsystem 83 where it is used to instantiate and run the required service instance.

Preferably, the service token includes the user's identity and is digitally signed by the service factory (with a corresponding certificate being included in the token). In this case, the sub-system 83 can both:

check that the service token originates from a service factory for which it is willing to provide service delivery (this check involves checking the identity of the signing party with the certification authority in standard manner); and check that the party sending the token is the same as the party identified in the token (the authenticity of which is guaranteed by the digital signature). Checking the sending party's identity is done using a challenge/response mechanism by which the service system 40 sends an item of data to the mobile entity and asks it to return it signed/encrypted under its private key (it being assumed that the mobile entity is provided with a public key/private key pair that are associated with the user). This enables the service system to check the identity of the user (with the user's certificate authority) and thus check whether the user is the same party as identified in the token.

Of course, since the basic challenge/response mechanism is something that is normally done between the system 40 and the mobile entity 20 without involvement of the user, the mechanism does not guard against the mobile entity having been stolen. As an added precaution, therefore, the user authentication process preferably further includes asking for the user to input a PIN number, this latter being known to the system 40 (such as by having been included in the token, possibly encrypted in a manner enabling only the service system 40 to decrypt it—for example, the service factory encrypts the PIN using the public key of the service system 40).

It will be appreciated that the same authentication process can equally be applied in full or in part to the case where the service token is replaced by a fully executable service instance code.

Figure 10:
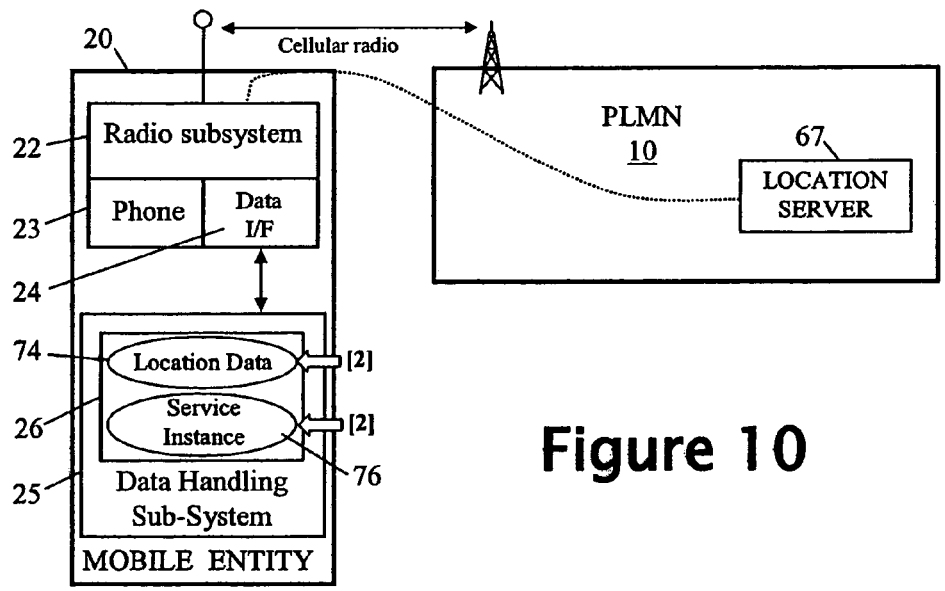
FIG. 10 is a diagram illustrating a fourth specific embodiment.

In the FIG. 10 embodiment the location descriptors 74 are again stored in the mobile entity 20 where location matching is effected. However, now the SIE 80 comprises the full service instance executable 76 stored in the mobile entity 20 and intended to execute in the mobile entity when a location match is detected. No external interaction with a preauthorised service element is required. Of course, external service interactions can be effected during the course of service execution (though not shown in FIG. 10). As already noted, the current location of the mobile entity can be provided by means other than the location server 67 of PLMN 10, for example by a built-in GPS system or from local location beacons, and in this case, wide-area connectivity is not required for mobile entity 20.

Variants

It will be appreciated that many variants are possible with respect to the above described embodiments with features described in relation to one embodiment also being adaptable for use with other of the embodiments. Thus, for example, the authentication features (digital signing of SIE 80 to check origin, user authentication through challenge/response mechanism, use of PIN) described above in relation to the FIG. 9 embodiment can also be used with the other embodiments. For example, where the SIE 80 is distributed by the service factory to a device or system under different control, it will generally be a good practice to have the SIE digitally signed by the service factory so as to enable the final service delivery system (system 40 in FIGS. 7 to 9) to check the origin of the SIE 80. Again, checking the identity of the user requesting service execution will often also be prudent, using a challenge/response mechanism and/or PIN input.

As noted above, the mobile entity 20 need not have wide-area connectivity. For example, communication with service system 40 could be through a short range wireless link (for example, an infra-red link or a Bluetooth radio connection). In fact, as already indicated with respect to the FIG. 10 embodiment, the mobile entity 20 need not have any external communication capability other than to enable it to determine its location.

The location descriptors and service instances elements can be stored by user, by service to be delivered, or in any other suitable distribution. For example, where different service systems 40 are used for different services in the embodiments of FIGS. 7 and 8 embodiments, then the database 75 of each service system 40 will store SIEs 80 relating to different users but the same service.

A service instance element can be arranged to specify a particular number of times (including only once) that the associated service instance can be run, each running of the service instance decrementing this count (or incrementing a count of the number of times the instance has been run).

The invention claimed is:

1. A service delivery method comprising the steps of:
   (a) conducting a transaction of a user purchasing a service or product which qualifies the user to benefit from a particular location-triggered service and, after the transaction has been conducted, storing:
      location data indicative of at least one location where service delivery is to be triggered; and
      a user-associated instance of an executable program, for implementing said particular service, the program instance being customized for said transaction and distinct from the location data; and
   (b) subsequently detecting a location match between the location of the user, as indicated by the location of a mobile entity associated with the user, and a location indicated by said location data, and thereupon initiating execution of the user-associated program instance to deliver said particular service to the user.

2. A method according to claim 1, wherein the user-associated program instance is a customisation of a generic program for implementing the service.

3. A method according to claim 1, wherein in (b), service delivery is conditional upon the user inputting a personal identification code.

4. A method according to claim 1, wherein service delivery only continues whilst the user's current location matches with a location indicated by the location data.

5. A method according to claim 1, wherein once initiated, service delivery is continued until completion, regardless of the location of the user.

6. A method according to claim 1, wherein the location data is indicative of multiple locations.

7. A method according to claim 1, further including storing multiple user-associated program instances associated with different services to be delivered to the same user in a common repository.

8. A method according to claim 1, wherein the user-associated program instance is passed by the party that carries out the qualification to the user or to a third-party, the program instance being digitally signed by the party that carries out the qualification step whereby to enable an eventual service deliverer to check the origin and authenticity of the user-associated program instance.

9. A method according to claim 1, wherein the current user location is provided to the entity carrying out location matching in (b) by a trusted location service provider and is digitally-signed by the latter.

10. A method according to claim 1, wherein the user-associated program instance specifies a particular number of times (including only once) that it can be run.

11. A method according to claim 1, wherein in (a), the user-associated program instance is stored in the mobile entity, the detection of said location match in (b) resulting in the program instance being executed at the mobile entity.

12. A method according to claim 1, wherein in (a), the user-associated program instance is stored in the mobile entity, the detection of said location match in (b) resulting in the program instance being passed from the mobile entity to a service provider system where it is then executed.

13. A method according to claim 1, wherein in (a), the user-associated program instance is stored in a service provider system, the detection of said location match in (b) resulting in the program instance being executed by the service provider system.

14. A method according to claim 13, wherein the user-associated program instance includes user identity data and is digitally-signed by the party that carried out the qualification in (a) whereby the service provider system can check the authenticity of the user-identity data, the user mobile entity having an associated key pair, formed by a public-key and a private key, and being required by the service provider system in (b) to authenticate its identity by using its private key to sign and return data proposed by the service provider system.

15. A method according to claim 1, wherein the user-associated program instance and the location data are stored in the same entity.

16. A method according to claim 1, wherein the user-associated program instance and the location data are stored in different entities, the location data having associated data enabling the entity storing the program instance to be informed when said location match is detected in (b).

17. A method according to claim 1 wherein the user associated program instance includes instructions advising the user to perform an act associated with the purchased service or product, the act being in addition to and different from the purchased service or product.

18. A service delivery system comprising:
   a location-data repository;
   a service repository;
   a service factory;
   a qualification subsystem for conducting a transaction of a user purchasing a service or product that qualifies the user to benefit from a particular location-triggered service, the qualification subsystem being arranged, upon determining that the user is so qualified, both to store in the location-data repository location data indicative of at least one location where service delivery is to be triggered, and also to create in the service factory and store in the service repository a user-associated instance of executable program for implementing said particular service, this program instance being customized for said transaction and being distinct from said location data;
   a service execution environment for executing user-associated program instances;
   a location-match subsystem for detecting a location match between the location of the user, as indicated by the location of a mobile entity associated with the user, and a location indicated by said location data; and
   a control arrangement responsive to the location-match subsystem detecting said location match to initiate execution of the user-associated program instance to deliver said particular service to the user.

19. A system according to claim 18, wherein the location-data repository is incorporated in said mobile entity associated with the user.

20. A system according to claim 18, wherein the service repository is incorporated in said mobile entity associated with the user.

21. A system according to claim 20, wherein the service execution environment is incorporated in said mobile entity associated with the user.

22. A system according to claim 20, wherein the service execution environment is separate from the mobile entity but can inter-communicate with the latter via a wireless infrastructure at least when the mobile entity is positioned to give rise to a location match, the mobile entity being operative to pass the user-associated program instance to the execution environment via the wireless infrastructure upon occurrence of said location match.

23. A system according to claim 18 wherein the user associated program instance includes instructions advising the user to perform an act associated with the purchased service or product, the act being in addition to and different from the purchased service or product.

* * * * *